EVERETT A. GILBERT
and GEORGE L. KING
INVENTORS

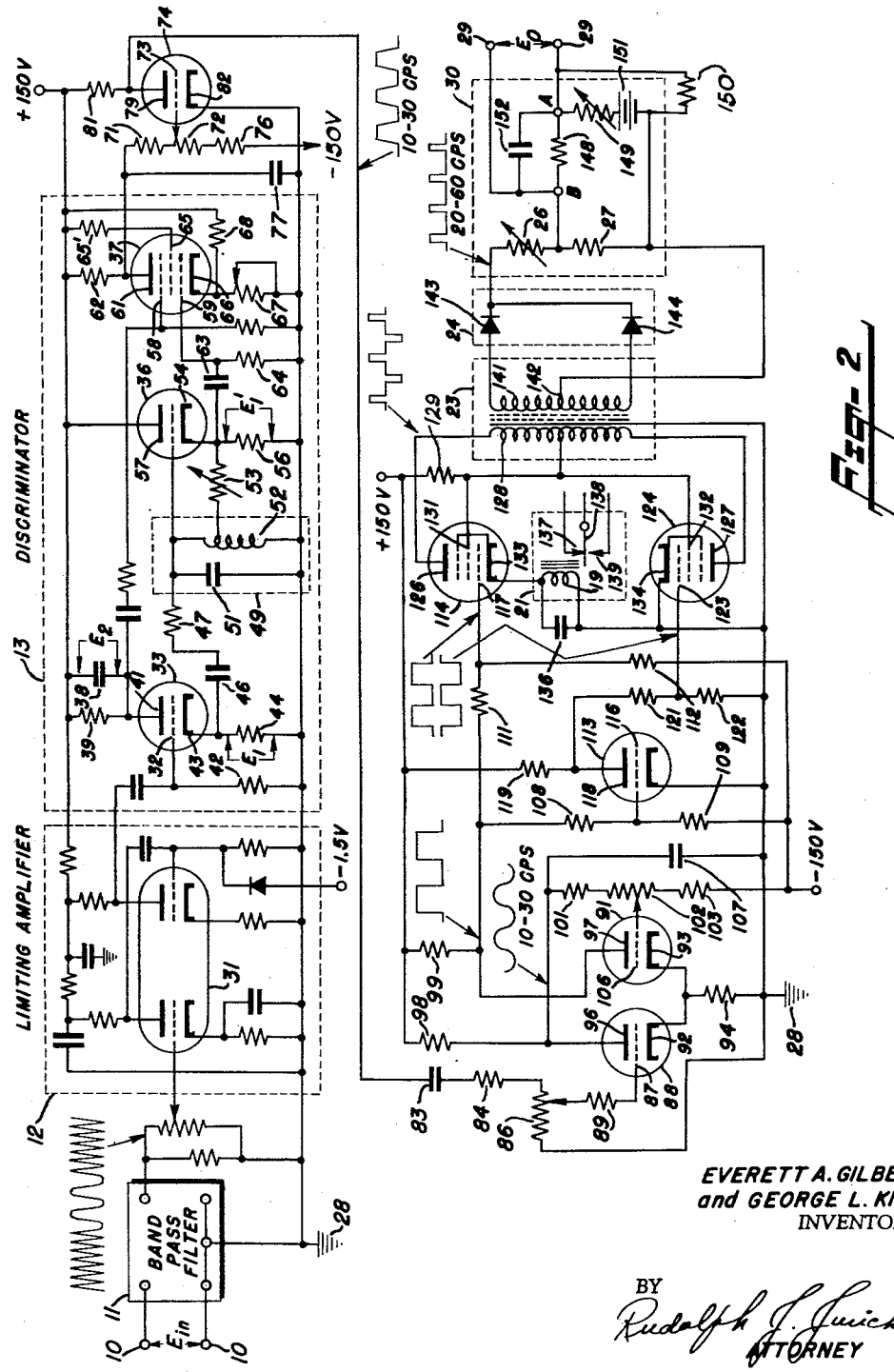

United States Patent Office 3,014,183
Patented Dec. 19, 1961

3,014,183
TELEMETER RECEIVER
Everett A. Gilbert, Denville, and George L. King, Morris Plains, N.J., assignors to Radio Frequency Laboratories Inc., Boonton, N.J., a corporation of New Jersey
Filed Jan. 7, 1958, Ser. No. 707,500
6 Claims. (Cl. 329—107)

This invention relates to telemetering apparatus and more particularly to a receiver for use in telemetering systems.

The telemeter receiver of our invention is of the frequency modulation type, wherein an input voltage of two different frequencies in alternate sequence is accurately converted to a direct current output; the magnitude of the direct current output voltage being directly related to the rate at which the carrier frequency shifts. The direct current millivolt output may be used to actuate a panel meter, drive a recorder, or actuate other suitable devices.

The receiver of our invention may be used in telemetering systems in which such quantities as speed, pressure, position, power, humidity and the like, are measured in terms of a direct current voltage, or converted into a direct current voltage or current by a suitable transducer. The direct current voltage is coupled to a suitable telemeter transmitter where the direct current voltage is first converted to pulses having a frequency of 10 to 30 cycles per second, directly proportional to the level of the input millivolts. The transmiter includes an audio frequency shift carrier circuit, modulated by the 10 to 30 cycle per second signal; such audio frequency shift carrier circuit permitting multiplexing several channels over a communication circuit. The receiver of our invention is adapted to reconvert the audio frequency shift carrier wave to a proportional direct current or millivolt output for the actuation of a recorder, or the like.

Our novel telemeter receiver includes a circuit design which prevents erroneous readings when the input level falls below a predetermined minimum. When the input signal drops below the predetermined minimum, the end equipment, such as the panel instrument or recorder, is made to read off-scale in the reverse direction thereby indicating below normal signals.

If the reverse current output which results from below minimum input levels is capable of damaging the output instrument or recorder, novel circuit means may be employed whereby the end equipment is automatically disconnected when the input signal falls below the predetermined minimum. Obviously, such circuitry may be employed in an alarm system for the actuation of warning lights, buzzers, and the like, in the event of signal failure.

An object of this invention is the provision of a telemeter receiver in which a frequency modulated input signal is accurately converted to a direct current output signal which is directly related in magnitude to the frequency of the input signal.

An object of this invention is the provision of a telemeter receiver having novel circuitry for the production of a reverse current output signal when the level of the input signal thereto falls below a predetermined minimum level.

An object of this invention is the provision of a protective device for a telemeter receiver comprising a relay which is actuated when the input to the receiver drops below a predetermined level, which relay may be usd to disconnect instruments in the receiver output and/or actuate an alarm device.

An object of this invention is the provision of an apparatus for producing a variation in a direct current output voltage in response to the frequency of D.-C. input pulses, the said apparatus comprising a regenerative amplifier responsive to the said pulses and operative only when the said pulses exceed a predetermined level, and discriminator means converting the regenerative amplifier output to a direct current output.

These and other objects and advantages will become apparent from the following description when taken with the accompanying drawings. The drawings are for purposes of illustration and are not to be construed as defining the scope or limits of the invention, reference being had for the latter purposes to the appended claims.

In the drawings wherein like reference characters denote like parts in the several views:

FIGURE 2 is a schematic circuit diagram thereof.

Figure 1:
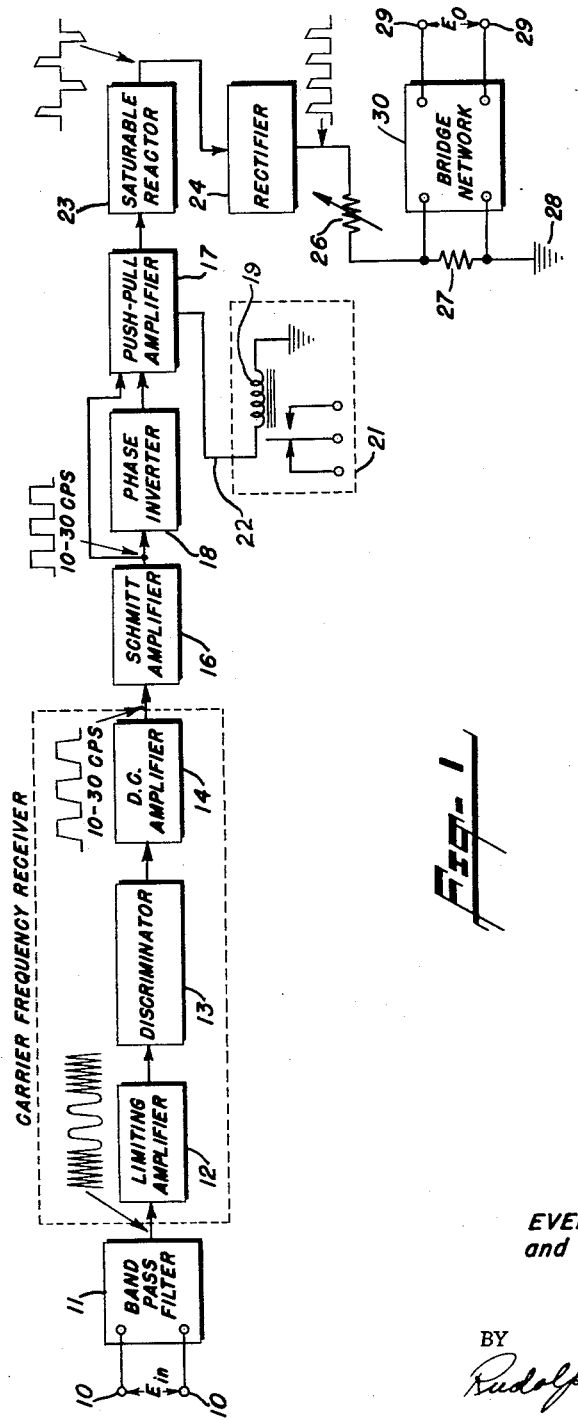
FIGURE 1 is a block diagram of our novel telemeter receiver.

Reference is first made to FIGURE 1 of the drawings where in the frequency modulated carrier input, designated $E_{in}$, is shown connected to input terminals 10 of our telemeter receiver. The carrier frequency is preferably within the audio frequency range, from 765 to 20,000 cycles per second. (This carrier frequency is shifted, by any suitable telemeter transmitter, approximately 10 percent at a rate between 10 and 30 cycles per second, the rate depending directly upon the magnitude of the quantity being telemetered. The modulated carrier is sent over a suitable communication channel and applied to the input terminals 10 of the receiver.) From the input terminals, the signal is first fed through a bandpass filter 11 where the frequency band of interest is selected from a generally wider communication channel. The output from the filter 11 is fed to a limiting amplifier 12. From the amplifier 12, the frequency modulated signal is fed to a frequency discriminator 13 where the said signal is converted to direct current pulses, the frequency of which pulses is the frequency at which the carrier wave is modulated, i.e., between 10 and 30 cycles per second.

The 10 to 30 cycle per second output from the discriminator is amplified by a direct current amplifier 14. The amplified 10 to 30 cycle per second signal from the amplifier is coupled to a Schmitt amplifier 16. The Schmitt amplifier is a regenerative type device which has a critical point of operation, i.e., below a certain predetermined sensitivity, which is preferably 0.7 volt root mean square, the circuit does not function. For input signals above this level, the output from the Schmitt amplifier is a square wave of the same frequency as the input signal thereto. The square wave signal from the Schmitt amplifier is coupled directly to a push-pull amplifier 17. The same Schmitt amplifier output square wave signal is applied to the push-pull amplifier through a phase inverter 18. The push-pull amplifier tubes are driven to plate current saturation and complete cut-off.

The solenoid 19 of a relay 21 is connected to the cathode circuit of the push-pull amplifier 17 through a lead wire 22. If the input signal to the Schmitt amplifier 16 is below the above-mentioned predetermined level, the push-pull amplifier will be cut off and no current will flow through the relay solenoid 19, with the result that the relay is unenergized. When the signal to the Schmitt amplifier rises to, or above, the predetermined level, the push-pull amplifier conducts and the relay 21 is energized. The relay contacts may be used to control a no-signal alarm, or may be employed to disconnect end equipment, such as meters and recorders, from the receiver output, or they may be used for any other desired purposes.

The push-pull amplifier output is fed to a saturable reactor 23. The core of the saturable reactor is made of sensitive magnetic material which saturates easily, whereby each cycle of the amplified output from the push-pull amplifier 17 drives the core well into saturation, first in one direction and then in the other. The saturable reactor ouput, therefore, comprises pulses of alternate opposite polarity, which pulses are of a predetermined fixed width and magnitude. The pulse repetition rate, of course, is a direct function of the square wave input to the saturable reactor. The pulses from the saturable reactor are rectified by a rectifier network 24 and the output therefrom is fed through a variable resistor 26 and a fixed resistor 27 to common ground potential, designated 28. The useful output voltage designated $E_0$ is fed to the output terminals 29 of the receiver through a bridge network 30. With a rectifier output of 20 pulses per second, the direct current output from the bridge network is adjusted for zero. With a rectifier output of 60 pulses per second, the output is a maximum positive potential, and if the input to the receiver drops below a predetermined value, the direct current output potential reverses polarity. Detailed circuitry for accomplishing the above results is shown in FIGURE 2 of the drawings.

Reference is now made to FIGURE 2 wherein, as in FIGURE 1, the input signal, $E_{in}$, is shown applied to the input terminals 10, and thence to the band pass filter 11. The carrier frequency is separated from the communication circuit by the band pass filter, and impressed on the control grid of a double triode vacuum tube 31 which, together with the associated circuitry, constitutes a limiting amplifier. The output signal of the amplifier is applied to the grid 32 of a vacuum tube 33 in the discriminator circuit; the said discriminator including, also, vacuum tubes 36 and 37, and associated circuitry. The tube 33 is arranged as a cathode follower and phase shifter with the impedance of the load capacitor 38 (as an example of a phase shifting impedance) being approximately 10,000 ohms at the carrier frequency. The capacitor 38 is in parallel with a plate load resistor 39, and the parallel connected capacitor and resistor connected in series between the anode 41 and the positive side of a 150 volt supply. The grid 32 is connected through a grid leak resistor 42 to the common ground 28. The cathode 43 of the tube 33 is connected to the common ground terminal through a cathode biasing resistor 44. Thus, the voltage $E_2$, across the capacitor 38, leads the voltage $E_1$ across the cathode resistor 44 by 90 degrees. The voltage, $E_1$, is applied through a D.-C. blocking capacitor 46 and isolating resistor 47, to a tuned circuit 49 comprising a parallel connected capacitor 51 and inductor 52.

In the audio range, the Q of the inductance coil 52 generally is not sufficiently high for narrow band operation. In order to increase the Q of the coil, and correspondingly the overall sensitivity of the circuit, the electron tube 36 is arranged to regeneratively feed back energy to the tuned circuit 49. The amount of energy so fed back is controlled by the value of a variable resistor 53, and such resistor is adjusted at the factory to a value which prevents oscillation of the tube. The tube 36 is connected as a cathode follower with the cathode 54 thereof being connected to the common ground potential through a cathode biasing resistor 56, and the anode 57 connected directly to the 150 v. supply.

The voltages $E_2$ (across the capacitor 38 in the plate circuit of the tube 33) and $E_1'$ (across the cathode biasing resistor 56 of the tube 36) are respectively applied to the control grids 58 and 59 of the tube 37, the anode 61 of which is connected to the positive side of the 150 volt supply through a plate load resistor 62. The tube 37 is a gated beam type 6BN6 which has a high transconductance between each control grid and the anode. Consequently, both grids exercise a high degree of control over the flow of the electron stream through the tube. Each grid can switch the plate current between cut-off and its limited value with only a relatively low applied grid signal. When alternating current signals are applied to the control grids 58, 59, each grid will tend to throw the tube into a condition of complete cut-off or complete conduction in accordance with the instantaneous signal polarities. Inasmuch as either grid can cut-off the flow of plate current, the tube will conduct only during that portion of each cycle for which the two grids are positive at the same time. By varying the relative phase of the grid signals the length of time that the tube conducts can be varied.

At the selected center frequency of the circuit, that is, at the resonant frequency of the tuned circuit 49, the voltage $E_1'$ applied to the grid 59 of the tube 37 through a coupling capacitor 63 and grid leak resistor 64 is in phase with the voltage $E_1$ developed across the cathode biasing resistor 44 of the tube 33, since under this condition the tuned circuit is resistive. When the applied signal frequency, $f$, is less than the resonant frequency $f_0$, of the tuned circuit, the latter effectively becomes inductive and the voltage $E_1'$ leads $E_1$. Conversely, when the signal frequency is greater than $f_0$, the tuned circuit effectively becomes capacitive and the voltage $E_1'$ lags $E_1$. The voltage $E_2$ applied to the other control grid 58 retains its 90 degree leading character relative to the voltage $E_1'$ applied to the first grid 59 under center band frequency conditions. It will be apparent that when the frequency, $f$, of the input signal is less than the resonant frequency, $f_0$, of the tuned circuit, the voltages $E_2$ and $E_1'$ applied to the two control grids of the tube 37 are relatively in phase and a maximum plate current will flow in the tube anode circuit. Conversely, when the input signal frequency is above the resonant frequency of the tuned circuit the voltage $E_1'$ becomes out of phase with the voltage $E_2$ whereby the two grids operate in an alternative manner to keep the flow of anode current at a minimum. Thus, the plate current of the discriminator tube 37 will increase or decrease, at a 10 to 30 cycle per second rate, which is the exact rate at which the carrier wave is frequency shift modulated.

The screen grid 65 of the tube 37 is connected through a screen resistor 65' to the positive 150 volt supply. The cathode 66 is connected to the junction between series connected voltage divider resistors 67 and 68, which resistors are connected between the positive 150 volt supply and the common ground terminal. The value of the resistor 67 is adjusted so that with no signal applied to circuit input terminals 10, the screen grid current, and the current through the resistor 68, will completely block plate conduction of the tube. A positive signal will thereby be produced at the anode 61 of the tube 37, which signal is coupled through a resistor 71 and potentiometer 72 to the grid 73 of a direct current amplifier tube 74. The potentiometer 72 is connected through a resistor 76 to a negative 150 volt supply.

Ordinarily, a modulated input signal is applied to the receiver input terminals 10, whereby the plate current of the tube 37 will increase, or decrease, at a 10 to 30 cycle per second rate. The carrier frequency is filtered from the signal by a capacitor 77 connected between the anode 61 and the common ground potential. The 10 to 30 cycle per second signal is coupled through the above described voltage dividing network (which includes the resistors 71, 72 and 76 and which functions as a bias control) to the grid 73 of the direct current amplifier tube 74. The output from the amplifier tube 74 is essentially a square wave at the modulation frequency, 10 to 30 cycles per second.

The anode 79 of the direct current amplifier tube 74 is connected to the positive 150 volt supply through a plate load resistor 81, while the cathode 72 thereof, is connected directly to the common ground connection. The anode of the direct current amplifier is connected through a series connected coupling capacitor 83, resistor 84 and potentiometer 86 to the common ground terminal 28. The signal from the direct current amplifier anode is developed across an adjustable portion of the potentiometer 86 and applied to the grid 87 of a tube 88 through a grid current limiting resistor 89. The tube 88, together with the tube 91, comprise a Schmitt amplifier, a regenerative type device which has a critical point of operation. Below a certain input signal level, preferably 0.7 volt R.M.S., the circuit does not function. For input signals above this level the output therefrom is a square wave.

The cathodes 92 and 93 of the tubes 88 and 91, respectively, in the Schmitt and amplifier, are connected through a common cathode coupling resistor 94 to the common ground 28, while the respective anodes 96 and 97 are connected through plate load resistors 98 and 99 to the positive 150 volt supply. The anode 96 of the tube 88 is connected through a series connected resistor 101, potentiometer 102 and resistor 103 to the negative 150 volt supply. The signal from the anode 96 is directly coupled to the grid 106 of the tube 91; the position of the potentiometer 102 setting the bias on the tube 91. The potentiometer 102 is adjusted for a maximum plate current flow in the tube 91 and a minimum plate current flow in the tube 88 when no signal is applied to the grid of the tube 88. It will be noted, that with no signal applied to the grid 87 of the tube 88, the tube 88 will be cut off by the bias developed across the common cathode resistor 94. When the level of the signal applied to the grid 87 of the tube 88 is great enough to cause a sufficient change in the plate current thereof to overcome this bias, the circuit becomes regenerative. The tube 88 then conducts on the positive alternations of the signal voltage thereto, while the tube 91 conducts on the negative alternations. When the input signal ceases, or falls below this critical operating level, the circuit returns to its original condition with tube 88 cut off and tube 91 conducting.

The anode 96 of the tube 88 is connected to the common connection through a harmonic suppression capacitor 107. The square-wave output from the Schmitt amplifier is taken from the anode 97 of the tube 91 and fed through coupling resistors 108, 109 and 111, 112 to a phase inverter tube 113 and one tube 114 of the push-pull amplifier, respectively. The grid 116 of the phase inverter is connected to the junction between the resistors 108, 109, while the grid 117 of the tube 114 is connected to the junction between the resistors 111 and 112. The resistors 109 and 112 are connected to the negative 150 volt supply. The anode 118 of the phase inverter tube 113 is connected to the positive 150 volt supply through the usual plate load resistor 119, and to the negative 150 volt supply through coupling resistors 121 and 122. The junction between the coupling resistors 121 and 122 is connected to the grid 123 of the other push-pull amplifier tube 124. The Schmitt amplifier output thereby provides drive signals to the push-pull amplifier tubes which are 180 degrees out of phase, as is well understood. The anodes 126 and 127 of the push-pull amplifier tubes are connected to the ends of a center-tapped primary winding 128 of the saturable reactor 23. The center tap of the primary winding is connected to the positive 150 volt source of potential through a voltage dropping resistor 129. The screen grids 131 and 132 of the push-pull amplifier tubes are also connected to the 150 volt supply source through the voltage dropping resistor 129.

The relay winding 19 of the relay 21 is connected in the cathode circuit of one of the push-pull amplifier tubes. The cathode 133 of the tube 114 is connected through the relay winding 19 to the common ground connection 28, while the cathode 134 of the tube 124 is connected directly to the common ground connection. A relay filter capacitor 136 is connected across the relay winding 19. Thus, it will be understood, that if the signal to the Schmitt amplifier input drops below the above-described predetermined level wherein tube 88 is cut-off and tube 91 conducts, the resulting negative potential at the anode 97 of the tube 91 is coupled to the grid 112 of the push-pull amplifier tube 114 thereby cutting off current flow therethrough. With the tube 114 cut off, no cathode current will flow therethrough, and the relay 21 in the cathode circuit will be unenergized. When the signal to the Schmitt amplifier rises above the predetermined level to produce an output therefrom, pulses of current will flow through the relay coil 19 as the push-pull amplifier tube 114 is switched on and off at the frequency of carrier modulation, 10 to 30 cycles per second. The capacitor 136 across the relay winding maintains an average current flow through the relay winding to keep the relay energized. The relay contacts 137, 138 and 139 may be used to control a no-signal alarm, disconnect recording equipment at the receiver output, or any other purpose desired.

The secondary winding 141 of the saturable reactor 23 is provided with a center tap 142. The core of the saturable reactor is made of sensitive magnetic material which saturates easily with relatively few ampere-turns. Therefore, the number of coulombs, per pulse, which are delivered from the secondary winding 141 to the rectifier network 24 is a fixed and stable quantity. The rectifier network 24, which includes a pair of rectifier elements 143, 144, receive the saturable reactor output pulses, which pulses vary in frequency according to the carrier modulation, 10 to 30 cycles per second. The rectified pulses are fed through the variable resistor 26 and resistor 27. A direct current voltage is thus developed across the resistor 27 which is proportional to the frequency of the pulses.

As mentioned above in the general description of our telemeter receiver, the receiver comprises a portion of a telemetering system, which system includes a suitable telemeter transmitter; a suitable telemeter transmitter being shown and described in our co-pending patent application entitled Telemetering Apparatus, Serial Number 707,499 and filed January 7, 1958, and now Patent No. 2,929,052. The input to the telemeter transmitter is a direct current signal which varies between zero and some predetermined value. The carrier wave output of the transmitter is frequency shift modulated at a rate between 10 and 30 cycles per second, the modulation rate being directly related to the direct current input to the transmitter. For example, with zero direct current input to the transmitter, the transmitter carrier wave output is modulated at a rate of 10 cycles per second. Thus, it will be understood, that for a 10 cycle per second modulation input to our receiver, a direct current receiver output of zero is necessary, to correspond to the zero direct current input potential to the telemeter transmitter. To this end, we utilize the bridge network 30.

The receiver output circuit bridge network 30 comprises a resistor 148, variable resistor 149, resistor 150, and a positive direct current potential source 151. The series connected potential source 151, variable resistor 149, and resistor 150 provide an adjustable base voltage at point A with respect to the common ground connection which is connected in opposition to the rectified output potential; the receiver output potential being developed across the resistor 148. A filter capacitor 152 is connected across the resistor 148 to smooth the direct current output which varies in frequency between 20 to 60 pulses per second. The adjustable resistor 149 is set to produce the necessary "bucking" potential whereby a zero potential is produced across the output resistor 148 when the output from the rectifier network 24 is at a rate of 20 pulses per second.

If, for any reason, the signal to the input ceases, or drops below the necessary level to drive the Schmitt amplifier, there is no output from the rectifier network. The potential output $E_0$ will thereby reverse polarity, and the point designated B will become negative with respect to point A. The negative input to the panel meter, recorder, or other instrument attached to the receiver output terminals is readily apparent. Therefore, any telemeter system failure which results in a zero input to the receiver of our invention, or which reduces the input level to the extent that the Schmitt amplifier remains unenergized, will cause the receiver output to assume negative polarity. Such failure is readily noticeable and may be remedied. If, however, negative output would damage the apparatus connected to the receiver output terminals, the contacts of the relay 21 may be included in the output connections to open the circuit to such apparatus and thereby prevent damage to the apparatus, since the relay is actuated when the input signal falls below the above-mentioned predetermined level.

Having now described our invention in detail in accordance with the requirements of the patent statutes, various modifications and changes will suggest themselves to those skilled in this art. It is intended that such changes and modifications shall fall within the spirit and scope of the invention as recited in the following claims.

We claim:

1. Apparatus for producing a variation in a direct current output voltage in response to the frequency of input pulses, the said apparatus comprising a regenerative amplifier responsive to the said input pulses, the said regenerative amplifier being operative to produce output pulses only when the said input pulses exceed a predetermined level, the said regenerative amplifier producing no output pulses when the input pulses are of a magnitude within the range of from zero to the said predetermined level, and discriminator means converting the regenerative amplifier output pulses to the direct current output voltage, the said discriminator means comprising a series connected saturable reactor and rectifier.

2. Apparatus for producing a variation in a direct current output in response to the frequency of direct current pulses of variable frequency, the apparatus comprising a regenerative amplifier responsive to the said direct current pulses, the said regenerative amplifier having an output only when the direct current pulses thereto exceed a predetermined level, the said regenerative amplifier having no output when the direct current pulses thereto range from zero to the said predetermined level, an amplifier responsive to the output from the regenerative amplifier, discriminator means converting the amplifier output to the direct current output, and a relay having a control winding connected to the said amplifier, the said relay being energized only when the input to the said regenerative amplifier exceeds the said predetermined level.

3. Apparatus for producing a variation in a direct current output potential in response to the frequency of D.-C. pulses of variable frequency, the said apparatus comprising a regenerative amplifier having an input and output circuit, means connecting the said D.-C. pulses of variable frequency to the said regenerative amplifier input circuit, the said regenerative amplifier being operative to produce output pulses at the output circuit thereof only when the said D.-C. pulses of variable frequency at the input circuit exceed a predetermined value, the said regenerative amplifier producing no output pulses when the said D.-C. pulses of variable frequency at the input circuit of the regenerative amplifier are of a magnitude within the range of from zero to the said predetermined value, a push-pull type amplifier having an input and output circuit, means connecting the regenerative amplifier output circuit to the said input circuit of the said push-pull type amplifier, and discriminator means responsive to the output from the said push-pull type amplifier.

4. The invention as recited in claim 3 including a relay having a control winding connected to the said push-pull type amplifier, the said relay being energized only when the said D.-C. pulses of variable frequency exceed the said predetermined value.

5. The invention as recited in claim 4 wherein the said relay is provided with normally open relay contacts, and an end device connected to the said discriminator output through the said relay contacts.

6. An apparatus for converting an alternating current input to a direct current directly proportional to the frequency of the input, the said apparatus comprising a regenerative amplifier responsive to the said input only when the said input reaches a predetermined level, the said regenerative amplifier producing no output when the input thereto is of a magnitude within the range of from zero to the said predetermined level, a push-pull type amplifier having input, output and cathode circuits, means connecting the said regenerative amplifier output to the push-pull type amplifier input circuit, discriminator means connected to the said push-pull type amplifier output circuit and responsive to the output therefrom, a relay having a control winding which comprises a portion of the said push-pull type cathode circuit, the said relay control winding being energized only when the said alternating current input reaches the stated predetermined level.

References Cited in the file of this patent

UNITED STATES PATENTS

| | | |
|---|---|---|
| 2,022,790 | Studry | Dec. 3, 1935 |
| 2,457,278 | Schvenbaum | Dec. 28, 1948 |
| 2,611,031 | Appert | Sept. 16, 1952 |
| 2,720,584 | Sloughter | Oct. 11, 1955 |
| 2,747,146 | McDonald | May 22, 1956 |
| 2,755,442 | Sherwood et al. | July 17, 1956 |
| 2,844,720 | Gilbert | July 22, 1958 |
| 2,867,767 | McGillem et al. | Jan. 6, 1959 |
| 2,938,166 | Hirsh | May 24, 1960 |